Figure 1:
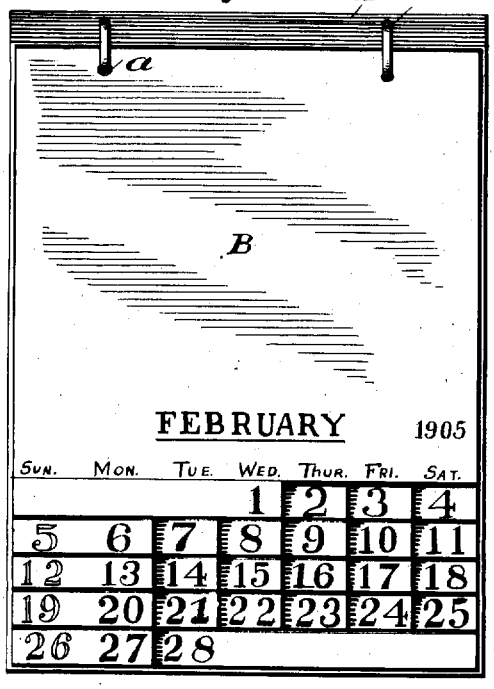

H. E. SHEDD.

CALENDAR.

APPLICATION FILED SEPT. 26, 1906.

12,861. Reissued Oct. 6, 1908.

Inventor

Hugh E. Shedd.

Witnesses

A. H. Bennett

L. H. Schmidt.

By John Rennie

Attorney

UNITED STATES PATENT OFFICE.

HUGH E. SHEDD, OF AUSTIN, MINNESOTA.

CALENDAR.

No. 12,861. Specification of Reissued Letters Patent. Reissued Oct. 6, 1908.

Original No. 795,009, dated July 18, 1905, Serial No. 252,507. Application for reissue filed September 26, 1906. Serial No. 336,373.

*To all whom it may concern:*

Be it known that I, HUGH E. SHEDD, a citizen of the United States, residing at Austin, in the county of Mower, State of Minnesota, have invented certain new and useful Improvements in Calendars, of which the following is a specification.

The present invention has reference to that class of calendars either in tablet form or in which the leaflets are loose and held together at their upper ends by suitable means which will admit of each leaflet being torn off or thrown up out of the way as required.

The object of the invention is to provide a calendar having the desired number of leaflets to correspond with the day or days of the month or months of the year; each leaflet having thereon the current day and with the exception of the first each of the leaflets also having thereon the day or days of the month which have passed. As each day passes, a leaflet is removed to expose the leaflet under it, which latter has thereon the days that have passed, with the next day following, the numerals indicating the days that have passed and the day following being of a different color or design, so as to distinguish them from each other.

The invention consists in a calendar substantially as shown in the drawings and hereinafter described.

Figure 2:
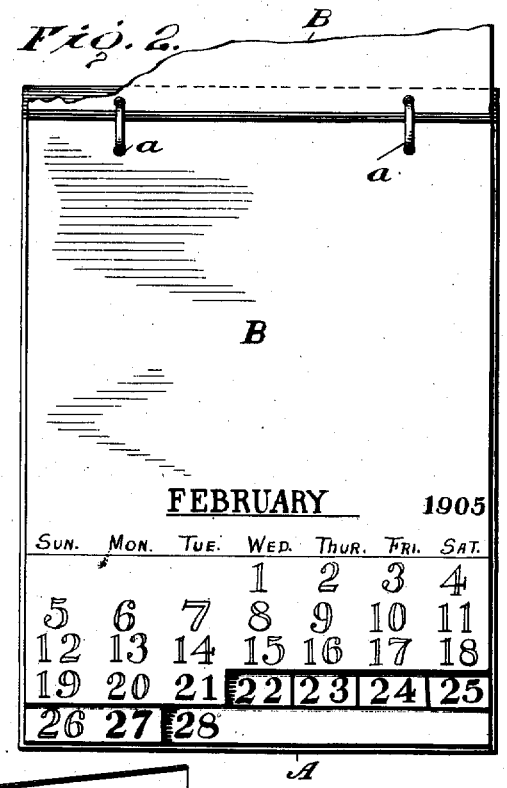
Figure 3:
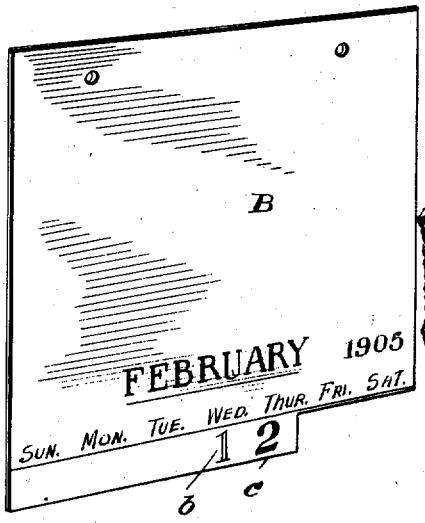
Figure 4:
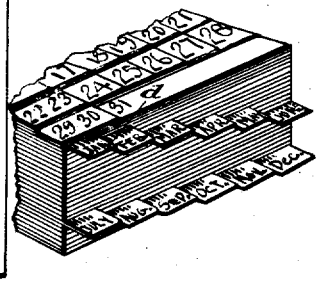

Figure 1 of the drawings is a front elevation of a calendar embodying my invention. Fig. 2, is a similar view showing several of the leaflets removed up to the twenty-first day of the month. Fig. 3 is a detail view in perspective of one of the leaflets. Fig. 4 is a detail view in perspective of the lower end of a yearly calendar, the last one of each series of leaflets of a month being provided with a tab with a distinguishing-mark thereon to indicate the month of the year.

In the accompanying drawings, A, represents the back of the calendar, which may be of any suitable material of sufficient stiffness or rigidity, and the leaflets B, are held thereto by fastenings *a*, as shown in Figs. 1 and 2 of the drawings. The back and means of fastening or holding the leaflets together may be changed or modified as found most preferable without in any manner departing from the essential feature of the invention, this being left to the discretion of the manufacturer. The leaflets B, have the names of the days of the week thereon and also the month, and the numeral representing the year, the indicated instance representing the month of February, 1905, the twenty-eight days being represented by numerals. Each leaflet, with the exception of the first in the illustration shown in the drawing, has a numeral or numerals indicating the days that have passed and a numeral indicating the current day, the days that have passed being represented by the open-line numerals *b*, and the current day being represented by solid-black numerals *c*, as shown in Fig. 3 of the drawings. In order to distinguish the days passed and the current day on each one of the leaflets, it is preferable to have the numerals of different designs or styles or of different colors, as found most preferable, and to represent one of many styles of numerals that may be used. The numerals are represented by open-line numerals and solid-black numerals, or any distinguishing form or shape or color may be substituted as found best adapted to the purpose. The leaflets B, are cut so as to display only the numerals or dates of the days passed and in addition thereto the numeral of the current day only, except when Sunday and Monday are shown on one leaflet.

In Fig. 1, of the drawings is shown a complete calendar for the month of February, which month has twenty-eight days, but as Sunday and Monday are indicated together on certain leaflets the number of the latter does not necessarily have to correspond with the number of days in a month. After the first day of the month has passed the leaflet bearing the numeral 1, is removed to expose the leaflet under it, which leaflet is shown in Fig. 3, of the drawings. It will now be seen as the first day of February is passed, that day will be represented on the now exposed leaflet as of a different form, style, or color, as the case may be, from that of the second or present day of the month, and so on throughout the series of leaflets. When the twentieth day of February has passed, the leaflet on which this particular date is indicated, is removed, exposing to view the leaflet immediately under it, which not only bears the numeral representing the current date (*i. e.* 21) but also numerals indicating the days that have passed from the first to the twentieth, inclusive, as shown in Fig. 2, of the drawing. As previously stated the numerals indicating the days which have passed are preferably different in color than the current date (*i. e.* 21), thus distinguishing the present day from the days that have gone before. The numerals indicating the Sundays of the month may be of the same color or design as the numerals representing the days that have passed, any color or design being used as found preferable.

As previously stated Sunday and Monday are both indicated on a single leaflet, which reduces the size of the calendar, and considerably reduces the expense of manufacturing the same, but if desired each day may be indicated on a single leaflet, without departing from the spirit and scope of my invention.

In Fig. 4, of the drawings is shown a portion of a calendar C, for the entire year and does not differ from the leaflets hereinbefore described, except that the last one of each series of leaflets of a month is provided with a tab *d*, having a distinguishing-mark thereon to designate the month, preferably an abbreviation of the month, as shown, thereby enabling the several leaflets comprising a month to be lifted up out of the way when desired.

Having now fully described my invention what I claim as new, and desire to secure by Letters Patent is—

1. A calendar comprising a plurality of leaflets, each leaflet having thereon suitable numerals indicating the days that have passed and a numeral indicating the current day only, each class of numerals being of different color or design to distinguish them from each other, substantially as and for the purpose set forth.

2. A calendar comprising a plurality of leaflets, each leaflet having thereon suitable numerals indicating the days that have passed and a numeral indicating the current day only, the last one of the series of leaflets of each month having a tab with distinguishing-mark to designate the month, substantially as and for the purpose specified.

3. A calendar comprising a plurality of leaflets having characters indicating the current day and characters indicating the days that have passed, the two sets of characters being different in design or color to distinguish them from each other, said leaflets being cut so that upon successive removal of the leaflets the current day, the days that are to come and the days that have passed will be exposed to view.

4. A calendar comprising a plurality of leaflets, having two groups of characters of different color or design, one group of characters indicating the days that have passed and the other group indicating the days to come and the current day, a series of the group of characters designed to be used to indicate the days of the month that are past being arranged to indicate particular days of the week, each leaflet being cut to expose to view the characters indicating the days that have passed, and the series of the group indicating particular days of the week, the characters representing the current day and the days that are to come.

5. A calendar comprising a plurality of leaflets having two groups of distinguishable characters, one group of characters indicating the days that have passed, and the other group of characters indicating the current day and the days to come, each leaflet being cut so that as each successive leaflet is removed characters of the two groups will be exposed to indicate days of a complete month.

6. A calendar comprising a set of leaflets representing a month, each set of leaflets having two groups of distinguishable characters, one group of characters indicating the days that have passed, and the other group of characters indicating the current day and the days to come, each leaflet being cut so that as each successive leaflet is removed characters of the groups will be exposed to indicate days of a complete month, and tabs arranged with reference to the monthly sets of leaflets to indicate each month.

7. A calendar comprising a plurality of leaflets, each leaflet having a character indicating the current date of a particular week in the month, each leaflet also having characters indicating the past dates of the same week, each leaflet being cut to expose the full dates of the whole month.

In testimony whereof I have hereunto set my hand and affixed my seal this 24th day of September 1906.

HUGH E. SHEDD. [L. S.]

In presence of—
H. M. Brown,
L. J. Dawson.